United States Patent [19]

Micek

[11] 4,035,841
[45] July 12, 1977

[54] TELEVISION PICTURE CENTERING CONTROL

[75] Inventor: Daniel W. Micek, Norridge, Ill.

[73] Assignee: Universal Research Laboratories, Inc., Elk Grove Village, Ill.

[21] Appl. No.: 617,240

[22] Filed: Sept. 26, 1975

[51] Int. Cl.² .......................................... H04N 5/68
[52] U.S. Cl. .................... 358/242; 273/DIG. 28; 315/370; 328/187; 358/230
[58] Field of Search .............. 178/7.5 SE, 69.5 DC, 178/DIG. 6, 6.8; 328/187; 315/370, 26; 358/187, 230, 242

[56] References Cited

U.S. PATENT DOCUMENTS

| | | | |
|---|---|---|---|
| 2,386,728 | 10/1945 | Theisen | 178/7.5 SE |
| 2,510,670 | 6/1950 | Trott | 178/7.5 SE |
| 2,556,934 | 6/1971 | Mulligan | 178/69.5 DC |
| 3,659,285 | 4/1972 | Baer | 358/93 |
| 3,697,681 | 10/1972 | McCoy | 178/DIG. 6 |
| 3,736,377 | 5/1973 | Warren | 178/DIG. 6 |
| 3,748,377 | 7/1973 | Bruinsma | 178/DIG. 6 |
| 3,793,483 | 2/1974 | Bushnell | 358/230 |
| 3,953,764 | 4/1976 | Miller | 178/6.8 |

*Primary Examiner*—Howard W. Britton
*Attorney, Agent, or Firm*—George H. Gerstman

[57] ABSTRACT

A control circuit is provided for centering a display on a cathode ray tube by manual adjustment. A reference signal is received corresponding to a fixed point on the display. A shift circuit provides a shifted synchronizing signal, having a shift that is variable, to place the fixed point at a desired location on the cathode ray tube. The shift may be either an advance or a delay of the signal.

10 Claims, 8 Drawing Figures

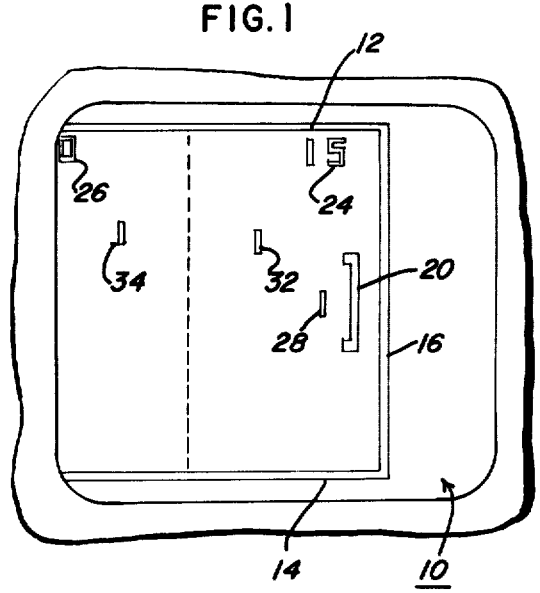
FIG. 1
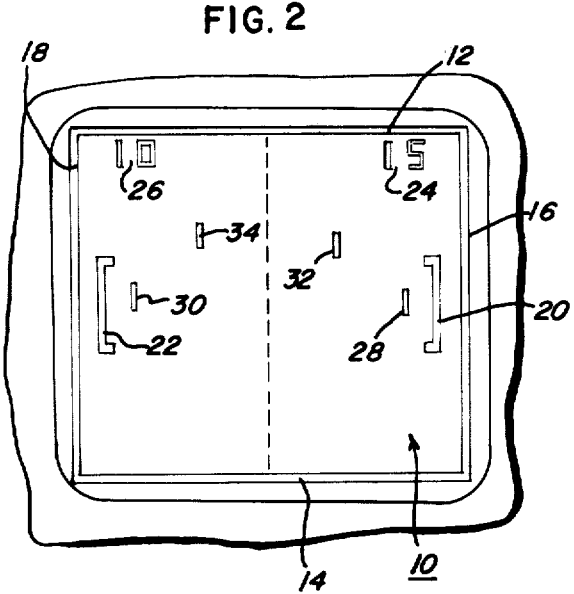
FIG. 2
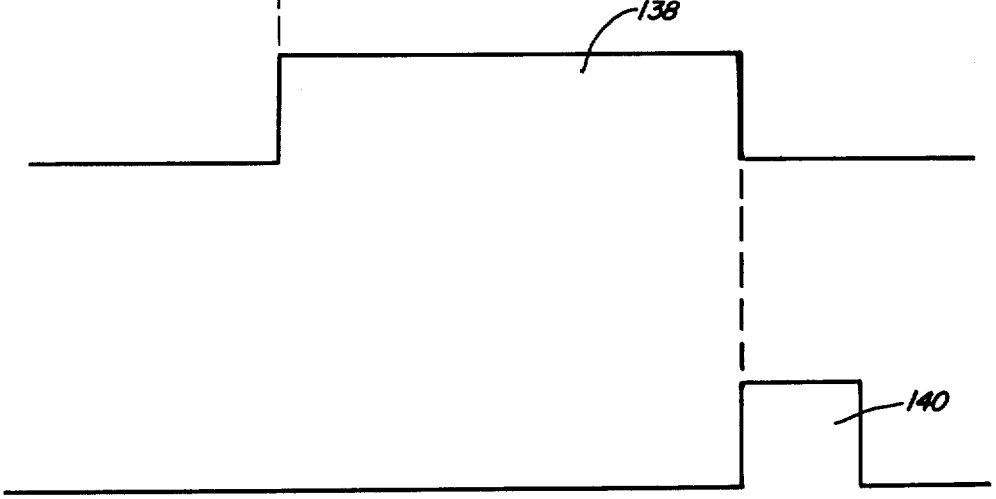
FIG. 6a
FIG. 6b
FIG. 6c

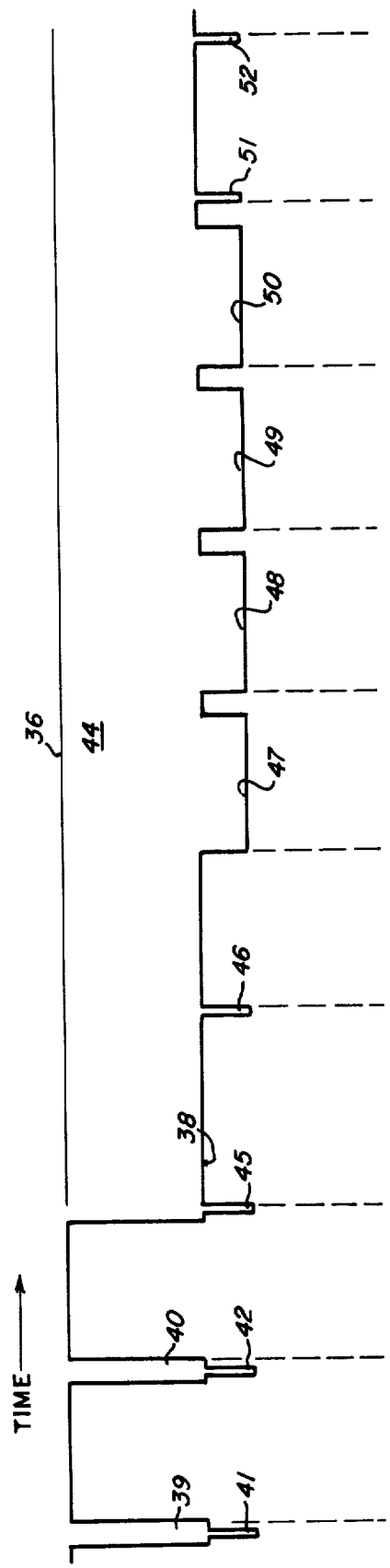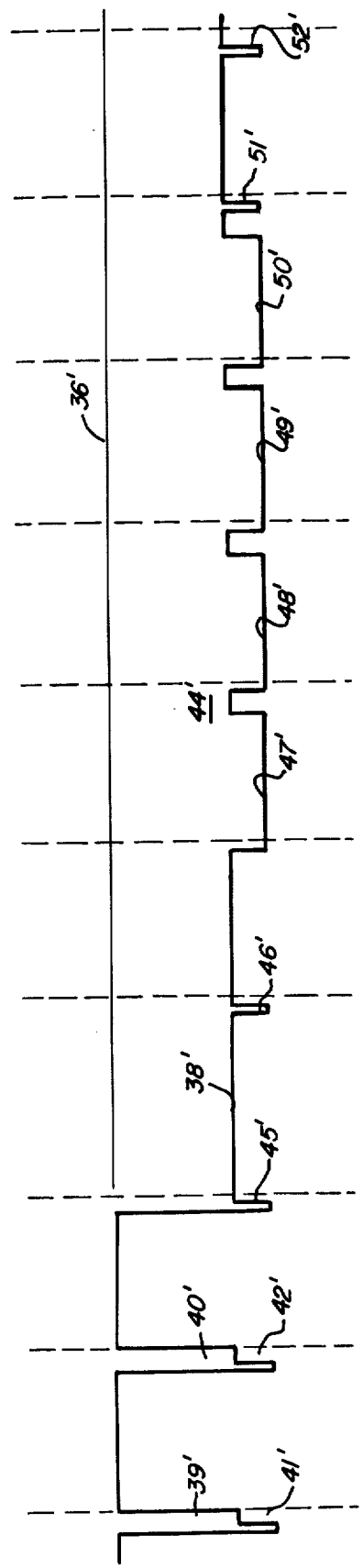

TELEVISION PICTURE CENTERING CONTROL

BACKGROUND OF THE INVENTION

The present invention concerns a novel circuit for centering a display on a cathode ray tube.

Television games have become quite popular. For example, such television games include ping pong, tennis, hockey, auto racing, shooting galleries and many other games, wherein the base lines display or background display is a fixed display on the cathode ray tube that is generated by digital circuitry. Typically such digital circuitry is manufactured by a different company than the company that manufactures the television set upon which the game is displayed. Due to variances between television receivers, it has been found on occasion that the display that is generated by the digital circuitry is not properly centered on the cathode ray tube. Thus a company assembling a tennis television game might find that after the television set and digital circuitry is assembled, a portion of the tennis court lines which should be displayed is actually outside of the viewing area of the cathode ray tube.

It is therefore an object of the present invention to provide a circuit which enables one to desirably center a dislay on a cathode ray tube. Such a centering circuit could be located, if desired, on a common printed circuit board with the other circuitry for generating the CRT display, sound, etc.

Another object of the invention is to provide a centering control circuit for cathode ray tube display, which enables an operator to set the display for placement is a desired location on the cathode ray tube by simple manual adjustment.

Other objects and advantages of the present invention will become apparent as the description proceeds.

BRIEF DESCRIPTION OF THE INVENTION

In accordance with the principles of the invention, there is provided a centering control circuit for cathode ray tube display. The control circuit includes means for receiving a reference signal corresponding to a fixed point on the display. Means are further included for providing a shifted synchronizing (SYNC) signal having a shift that is variable to place the fixed point at a desired location on the cathode ray tube.

In the illustrative embodiment of the invention, the means for providing a shifted SYNC signal include means for generating a second signal in response to the reference signal, means for varying the time of the second signal and means for generating the SYNC signal in response to the second signal. The signals are rectangular pulses and the second signal has a leading edge that is coincidental with the trailing edge of the reference pulse with the SYNC signal having a leading edge that is coincidental with the trailing edge of the second signal.

A more detailed explanation of the invention is provided in the following description and claims, and is illustrated in the accompanying drawings.

BRIEF DESCRIPTION OF THE DRAWINGS

FIG. 1 is a front view of a cathode ray tube, having an off-center display of the backfield of a hockey television game;

FIG. 2 is similar to FIG. 1, but illustrates the cathode ray tube with the hockey television game display properly centered on the tube;

FIG. 3 is a waveform diagram showing synchronizing and blanking pulses for a television game;

FIG. 4 is a waveform diagram, in vertically timed relationship with the diagram of FIG. 3, showing blanking pulses, and also showing synchronizing pulses that have been modified by a centering circuit to the principles of the present invention;

FIGS. 6A, 6B and 6C are timing diagrams showing, in vertical timed relationship, pulses generated by the FIG. 5 circuitry.

DETAILED DESCRIPTION OF THE ILLUSTRATIVE EMBODIMENT

Figure 5:
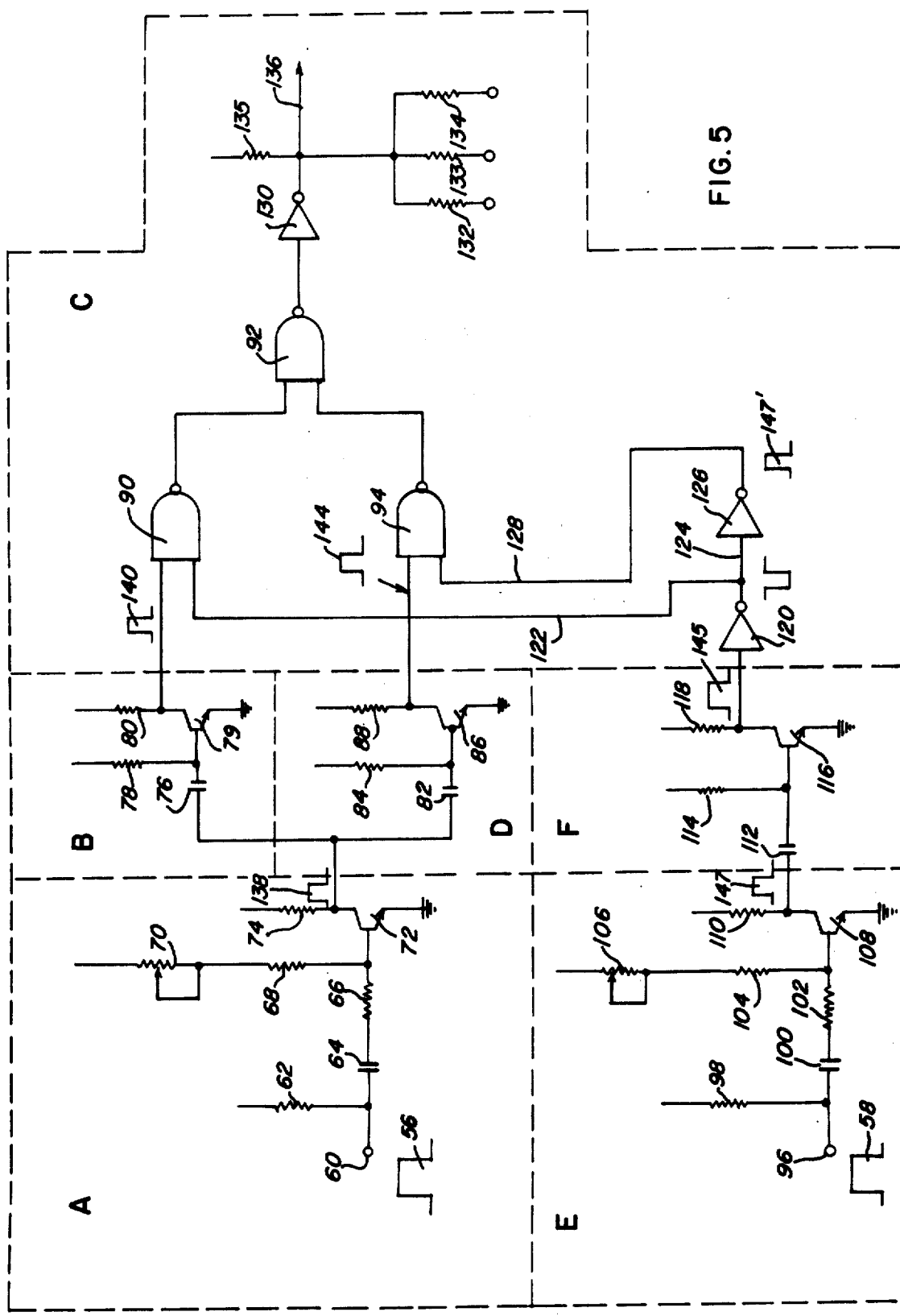
FIG. 5 is a schematic circuit diagram of a centering control circuit constructed in accordance with the principles of the present invention.

Referring to FIGS. 1 and 2, cathode ray tube 10 is shown displaying a hockey television game including upper base line 12, lower base line 14, right base line 16 and left base line 18. The display further includes right goal 20, left goal 22, right score 24, left score 26, right goalie 28, left goalie 30, right forward 32 and left forward 34. Because the display is not properly centered on the cathode ray tube of FIG. 1, left base line 18, left goal 22, left score 26 and left goalie 30 are not displayed. Obviously the hockey television game cannot be properly played using the FIG. 1 display and the present invention provides circuitry which permits an operator to manually adjust the synchronization pulses so that the hockey background can be displayed as illustrated in FIG. 2.

A diagram showing typical synchronizing and blanking pulses, such as used in television games, is illustrated in FIG. 3. FIG. 3. shows, with respect to reference white level 36 and blanking level 38, horizontal blanking pulses 39 and 40 carrying horizontal SYNC pulses 41 and 42, respectively, a portion of a vertical blanking pulse 44 carrying equalizing pulses 45, 46, vertical SYNC, composed of pulses 47, 48, 49, 50 and equalizing pulses 51 and 52. Assuming that the pulses illustrated in FIG. 3, when fed to the deflection system of a television, results in a portion of the FIG. 1 display, the present invention contemplates the variable advance or delay of the SYNC pulses in order to display the picture properly on the cathode ray tube, as in FIG. 2.

In FIG. 4, blanking and synchronizing pulses are shown which correspond to the blanking and synchronizing pulses of FIG. 3, but having an advance which has been provided by a circuit such as the circuit of FIG. 5. Like reference numerals but with primes added have been used in FIG. 4 to designate the corresponding pulses of FIG. 3, and FIGS. 3 and 4 have been drawn in vertically timed relationship. It can be seen that SYNC pulses 41', 42', 45', 46', 47', 48', 49', 50', 51'and 52' have been advanced, respectively, with respect to SYNC pulses 41, 42, 45, 46, 47, 48, 49, 50, 51 and 52. Accordingly, the picture will be "moved" with respect to the cathode ray tube screen.

An illustrative centering control circuit constructed in accordance with the principle of the present invention is illustrated in FIG. 5. Initially, a fixed reference pulse with respect to the picture information is established both horizontally and vertically with a polarity (with respect to ground) as indicated by horizonatal reference pulse 56 and vertical reference pulse 58 on FIG. 5. The vertical reference pulse is much longer than the horizontal reference pulse because the vertical sweep (60 Hertz) is slower than the horizontal sweep (15,750 Hertz) on standard televisions in the United States. As a typical example, although no limitation is intended, the horizontal reference pulse width could be between 3 microseconds and 10 microseconds and the vertical reference pulse width could be between 1 millisecond and 3 milliseconds.

If the reference pulses are to be generated from a digitally created picture, such as illustrated in FIGS. 1 and 2, appropriate horizontal and vertical reference pulses are decoded from the horizontal and vertical timing schemes used for the picture. The horizontal and vertical reference pulses must be fixed with reference to the picture at all times. To this end, the horizontal reference pulse could be derived from the signal corresponding to right base line 16 on the FIG. 1 display. Likewise, the vertical reference pulse could be derived from the signal corresponding to lower base line 14 of FIG. 1.

For convenience in understanding the operation of the FIG. 5 circuitry, subcircuits have been enclosed by dashed lines and marked as subcircuits A, B, C, D, E and F.

Subcircuit A comprises input 60 which receives horizontal reference pulse 56, also resistor 62, capacitor 64, resistors 66 and 68, potentiometer 70, NPN transistor 72 with its emitter coupled to ground, and resistor 74. The collector of transistor 72 is commonly connected to subcircuits B and D. Subcircuits B includes capacitor 76, resistor 78, NPN transistor 79 with its emitter coupled to ground, and resistor 80. Subcircuit D includes capacitor 82, resistor 84, NPN transistor 86 with its emitter coupled to ground, and resistor 88. The collector of transistor 79 is connected to one input of NAND gate 90, the output of which is connected to one input of NAND gate 92. The collector of transistor 86 is connected to one input of NAND gate 94, the output of which is connected to the other input of NAND gate 92.

Subcircuit E includes input 96 which receives vertical reference pulse 58, also resistor 98, capacitor 100, resistors 102 and 104, potentiometer 106, NPN transistor 108 with its emitter connected to ground, and resistor 110. The collector of transistor 108 is connected to subcircuit F which includes capacitor 112, resistor 114, NPN transistor 116 with its emitter connected to ground, and resistor 118. The collector of transistor 116 is connected to inverter 120, the output of which is connected via line 122 to the other input of NAND gate 90 and via line 124 to another inverter 126. The output of inverter 126 is connected via line 128 of the other input of NAND gate 94.

The output of NAND gate 92 is connected to an inverter 130, the output of which is mixed with blanking and picture information via a network including mixing resistors 132, 133, 134 and pull-up resistor 135, to be fed via line 136 as a composite video signal to an RF oscillator or video amplifier.

Although no limitation is intended, as a specific example the circuit of FIG. 5 may contain components having the following parameters, with resistors 62, 74, 78, 80, 84, 88, 98, 110, 114, 118, 135 and potentiometers 70 and 106 connected to a +5 volt source:

| Component | Value or Type |
|---|---|
| Resistor 62 | 1K |
| Capacitor 64 | .003 MFDS |
| Resistor 66 | 270 Ohms |

-continued

| Component | Value or Type |
|---|---|
| Resistor 68 | 6.8K |
| Potentiometer 70 | 5K |
| Transistor 72 | 2N3416 |
| Resistor 74 | 1K |
| Capacitor 76 | .0047 MFDS |
| Resistor 78 | 2.2K |
| Transistor 79 | 2N3416 |
| Resistor 80 | 1K |
| Capacitor 82 | .01 MFDS |
| Resistor 84 | 18K |
| Transistor 86 | 2N3416 |
| Resistor 88 | 1K |
| Resistor 98 | 1K |
| Capacitor 100 | .27 MFDS |
| Resistor 102 | 270 Ohms |
| Resistor 104 | 8.2K |
| Potentiometer 106 | 5K |
| Transistor 108 | 2N3416 |
| Resistor 110 | 1K |
| Capacitor 112 | .039 MFDS |
| Resistor 114 | 18K |
| Transistor 116 | 2N3416 |
| Resistor 118 | 1K |

Referring to subcircuit A, horizontal reference signal or pulse 56 is received by input 60, the trailing edge of which causes the output at the collector of transistor 72 to go high for a time determined by capacitor 64, resistors 66 and 68 and potentiometer 70, measured from the trailing edge of pulse 56. The pulse 138 at the collector of transistor 72 is shown in FIG. 6B, with its leading edge being coincidental with the trailing edge of pulse 56 and the duration of pulse 138 being dependent on the setting of potentiometer 70. Thus subcircuit A generates a second signal or pulse that is displaced with the trailing edge of the reference pulse, and with the leading edge of the pulse at the collector of transistor 72 being coincidental with the trailing edge of the reference pulse.

Subcircuit B is used for generating a pulse 140 whose leading edge is coincidental with the trailing edge of pulse 138 and whose duration is fixed. Thus subcircuit B uses pulse 138 and with capacitor 76 and resistor 78 develops an output pulse 140 that goes high at transistor 79. Pulse 140 serves as the horizontal SYNC for the television receiver. Although no limitation is intended, as a typical example, horizontal SYNC pulse 140 could be a 5 microsecond pulse.

Subcircuit D is similar to subcircuit B except for the circuit values. The circuit values are selected as such that the output at the collector of transistor 86 may go high for about 55 microseconds, although this is only a specific example and no limitation is intended. The pulse 144 at the collector of transistor 86, when gated with pulse 147', operates as a vertical SYNC pulse, as will be described below.

Vertical reference pulse 58 is received by input 96 of subcircuit E, and subcircuits E and F function in similar manner to subcircuits A and B. The high-going pulse 145 at the collector of transistor 116 serves as the gating pulse for pulse 144, the combining of which produces a chopped vertical SYNC pulse at the output of NAND gate 94, for the television receiver. Potentiometer 106 is the vertical centering control which adjusts the width of the third signal or pulse 147 at the output of transistor 108. The leading edge of the pulse 147 at the collector of transistor 108 is coincidental with the trailing edge of reference pulse 58 and, as stated above, its width is varied by varying potentiometer 106. Likewise, the leading edge of gating pulse 145 is coincidental with the trailing edge of the pulse at the collector of transistor 108. Typically the gating pulse 145 at the collector of transistor 116 may be about 500 microseconds, although no limitation is intended.

Subcircuit C illustrates the gating necessary to form a composite SYNC signal satisfactory for the television receiver. During vertical SYNC, the horizontal SYNC is maintained so that the picture is completely "locked" to the control circuitry. Mixing resistors 132, 133 and 134 provide a means for combining SYNC, blanking and picture information in the proper proportions to make up the final composite signal for video.

It can be seen that subcircuit C operates to gate one or the other of the SYNC pulses 140 and 144, but not both at the same time. Inverters 120 and 126 are simple inverters to speed up the rise and fall of the edges of the gating pulse 145.

It can be seen that when inverter 120 provides a positive signal, an inverted pulse output is provided at the output of gate 90. When inverter 126 provides a positive signal, an inverted output signal is provided by gate 94. Inverter 120 and inverter 126 always have opposite polarity signals so that gate 90 and gate 94 will never provide simultaneous inverted pulse outputs. The resulting output signal is a series of horizontal SYNC pulses (which will be carried by blanking pulses) and a series of vertical SYNC pulses which will be carried by a long, vertical blanking pulse, all as depicted in FIG. 4.

Although an illustrative embodiment of the invention has been shown and described, it is to be understood that various modifications and substitutions may be made without departing from the novel spirit and scope of the present invention. For example, although a horizontal shift of the picture is shown in FIG. 2, the present invention also can readily be used for a vertical shift, or for a combined horizontal and vertical shift of the picture.

What is claimed is:

1. A centering control circuit for a cathode ray tube display in which a synchronizing signal is provided for synchronizing the cathode ray tube raster scanning, which centering control circuit enables an operator to set the entire picture displayed on the cathode ray tube for placement in a desired location on the cathode ray tube by manual adjustment, comprising means for receiving a reference signal corresponding to a fixed point on the display; and manually variable means for providing a shifted synchronizing signal having a shift that is variable to place said fixed point at a desired location on the cathode ray tube, whereby the entire picture displayed on the cathode ray tube is placed in a desired location on the cathode ray tube.

2. A centering control circuit as described in claim 1, wherein said providing means includes means for generating a second signal in response to said reference signal, means for varying the time of said second signal and means for generating said synchronizing signal in response to said second signal.

3. A centering control circuit as described in claim 2, wherein said signals are rectangular pulses.

4. A centering control circuit as described in claim 3, wherein said second signal has a leading edge that is coincidental with the trailing edge of said reference pulse.

5. A centering control circuit as described in claim 4, wherein said synchronizing signal has a leading edge that is coincidental with the trailing edge of said second signal.

6. A centering control circuit for cathode ray tube display having a synchronizing signal for sychronizing the cathode ray tube raster scanning, which centering control circuit enables an operator to set the entire picture displayed on the cathode ray tube for placement in a desired location on the cathode ray tube by manual adjustment, said centering control circuit comprising means for receiving a horizontal reference signal corresponding to a fixed point on the display; means for receiving a vertical reference corresponding to a fixed point on the display; and manually operable means for providing shifted horizontal and vertical synchronizing signals with each of said synchronizing signals having shifts that are variable to place said fixed points at desired locations on the cathode ray tube, whereby the entire picture displayed on the cathode ray tube is placed in a desired location on the cathode ray tube.

7. A centering control circuit as described in claim 6, wherein said providing means includes means for generating a second signal in response to said horizontal reference signal, means for varying the time of said second signal and means for generating said horizontal synchronizing signal in response to said second signal; means for generating a third signal in response to said vertical reference signal, means for varying the time of said third signal and means for providing a gating signal in response to said third signal.

8. A centering control circuit as described in claim 7, including means for gating said synchronizing signals and for mixing said synchronizing signals with blanking and picture information to provide a composite video signal.

9. A centering control circuit for cathode ray tube display, comprising means for receiving a horizontal reference signal corresponding to a fixed point on the display; means for receiving a vertical reference signal corresponding to a fixed point on the display; means for providing shifted horizontal and vertical synchronizing signals with each of said synchronizing signals having shifts that are variable to place said fixed points at desired locations on the cathode ray tube; said providing means including means for generating a second signal in response to said horizontal reference signal, means for varying the time of said second signal and means for generating said horizontal synchronizing signal in response to said second signal; means for generating a vertical synchronizing signal in response to said second signal; means for generating a third signal in response to said vertical reference signal, means for varying the time of said third signal and means for providing a gating signal in response to said third signal.

10. A centering control circuit as described in claim 9, including gating means for gating said vertical synchronizing signal in response to said third signal.

* * * * *